(12) United States Patent
Abraham, III et al.

(10) Patent No.: US 8,098,169 B2
(45) Date of Patent: Jan. 17, 2012

(54) METHODS AND APPARATUS FOR MONITORING A PLURALITY OF WORKSITES

(76) Inventors: Remo Thomas Abraham, III, Youngsville, LA (US); Robert P. Luke, Youngsville, LA (US)

(*) Notice: Subject to any disclaimer, the term of this patent is extended or adjusted under 35 U.S.C. 154(b) by 398 days.

(21) Appl. No.: 12/435,016

(22) Filed: May 4, 2009

(65) Prior Publication Data
US 2010/0277341 A1    Nov. 4, 2010

(51) Int. Cl.
G08B 19/00    (2006.01)
G08C 19/16    (2006.01)
G08C 15/06    (2006.01)
G08C 19/20    (2006.01)

(52) U.S. Cl. .......... 340/870.09; 340/870.01; 340/870.03

(58) Field of Classification Search ............. 340/870.01, 340/870.03, 870.09
See application file for complete search history.

(56) References Cited

U.S. PATENT DOCUMENTS
2008/0155064 A1*    6/2008   Kosuge et al. ................ 709/219
* cited by examiner Primary Examiner — Dharti Patel
Assistant Examiner — Hai L Nguyen

(57) ABSTRACT

Embodiments provide methods for monitoring a plurality of worksites at a facility, the methods including transporting a central monitoring station package to the facility, seating a transport container, stationing worksite monitoring equipment packages at the worksites, connecting communication links from the worksite monitoring equipment packages to central monitoring station equipment, transmitting remote transmissions from worksite monitoring equipment packages to central monitoring station equipment, displaying worksite monitoring information for a monitoring technician, and responding when remote monitoring information received from a worksite meets a response threshold criteria.

23 Claims, 12 Drawing Sheets

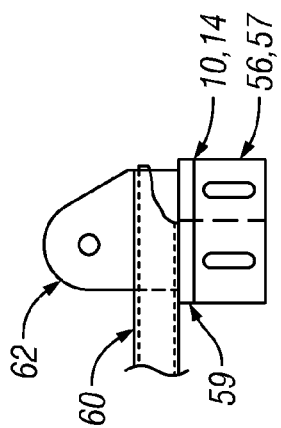
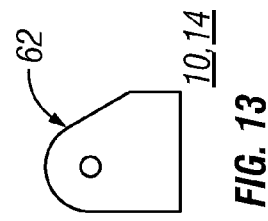
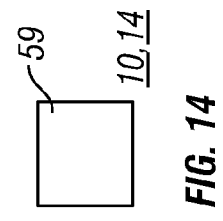
FIG. 12
FIG. 13
FIG. 14
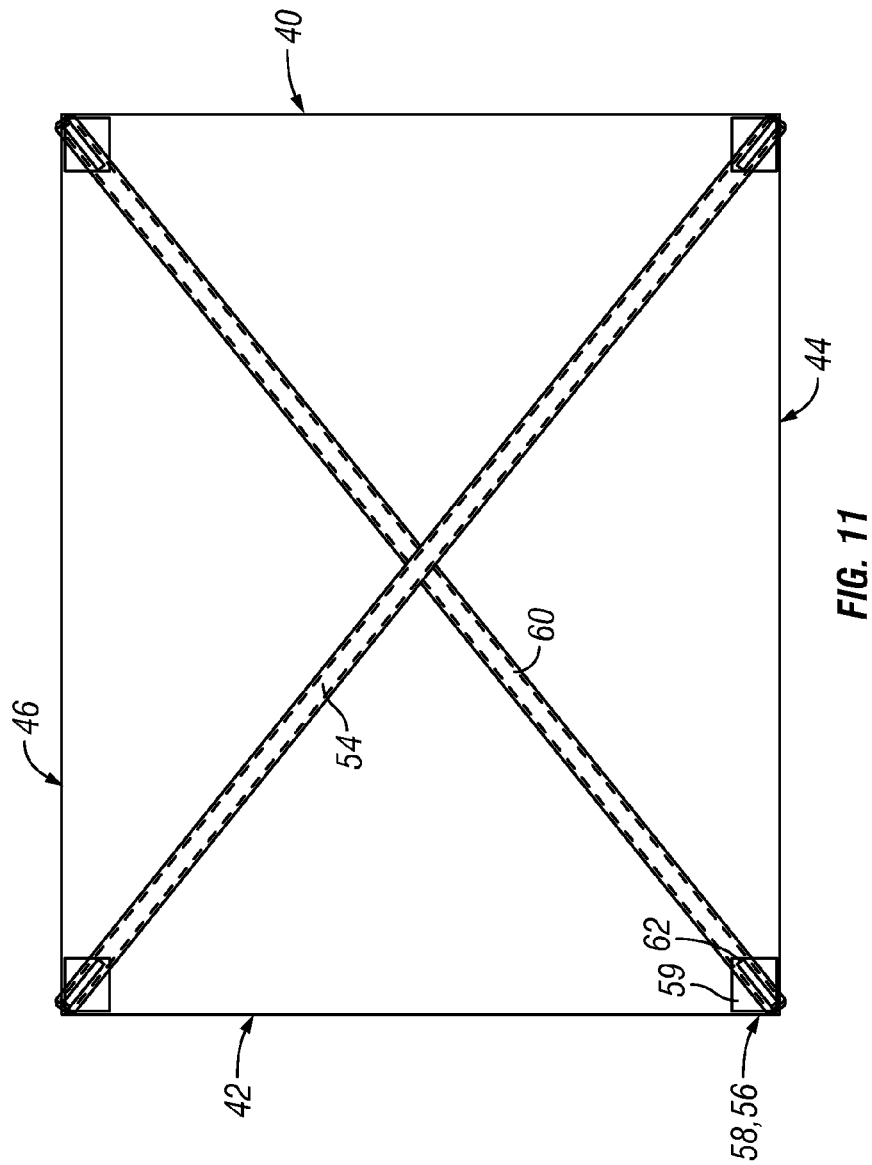
FIG. 11

METHODS AND APPARATUS FOR MONITORING A PLURALITY OF WORKSITES

FIELD OF THE INVENTION

The disclosure relates to methods and apparatus for monitoring a plurality of worksites.

BACKGROUND OF THE INVENTION

The disclosure relates to methods and apparatus for monitoring a plurality of worksites at a facility. One example of such a facility is an offshore facility for the production of petroleum, of the type referred to as "offshore rigs" or "offshore platforms". It will be understood that an offshore facility can include floating vessels, semi-submerged vessels, submerged vessels, work barges, work boats, floating production systems (FPS), and need not be fixed relative to the earth. It will also be understood that other types of facilities located on dry land, such as petroleum refineries, chemical plants, large buildings to be renovated, remote pipelines, and mines, can be serviced with methods and apparatus of the disclosure. All types of worksites within such facilities can be serviced using methods and apparatus of the disclosure. These worksites can include worksites including one or more confined spaces. Examples of confined space worksites include, for example, the interior of a tank, a hull of a vessel, or a spar of an FPS. Generally, a "confined space" includes any worksite where egress by a worker from a potentially dangerous condition, or ingress by rescue personnel, is limited by a substantial restriction. Examples of restrictions are doorways, hatches, ladders, vertical distance, vertical exit hatches, crawl spaces, scaffolding, suspended platforms, walls, or any other condition which limits egress by a worker. It will be understood that "worksite", although not limited to the following, includes locations where work at a facility tends to be temporary in nature, and frequently involves maintenance, repair, cleanup, demolition, renovation, or construction projects. Numerous such worksites can be operational at any one time in a large facility, such as a large offshore facility, such as when work crews are scattered about performing maintenance duties inside large tanks, spars, and similar structures. Frequently, the tanks contain residual flammable materials and flammable vapors, or materials in use by the crews are flammable materials or create flammable vapors. Likewise, tanks and confined spaces can include harmful gases such as carbon monoxide and $H_2S$. In some situations, workers are situated in elevated or suspended positions inside confined, dark tanks having a single, distant access hatch. One way to monitor worker safety in such situations is to assign a "hole watcher" who is charged with standing outside the tank access hatch and periodically peering inside to determine if other workers located inside the tank are working normally, or if someone requires assistance from rescue personnel. Rescue can be difficult to effectuate, because numerous power cables and ventilation ducts may also enter the tank through the same access hatch, and due to confined space entries. If the "hole watcher" attempts to enter the tank and assist a worker in duress, the door looker can also be overcome by conditions such as hazardous gases, thus endangering the safety of all members of a work crew at the same worksite. If the "hole watcher" becomes distracted and fails to observe conditions and promptly notify rescue personnel to respond to dangerous conditions, catastrophic injuries and economic losses can result.

For the reasons stated above, and for other reasons stated below which will become apparent to those skilled in the art upon reading and understanding the present specification, there is a need in the art for improved methods and apparatus for monitoring a plurality of worksites.

BRIEF DESCRIPTION OF THE INVENTION

The above-mentioned shortcomings, disadvantages and problems are addressed herein, which will be understood by reading and studying the following specification.

In one aspect embodiments provide improved methods for monitoring a plurality of worksites. In one aspect embodiments provide improved apparatus for monitoring a plurality of worksites. In one aspect, embodiments provide improved methods and apparatus wherein apparatus including a transportable central monitoring station package and a plurality of worksite monitoring equipment packages are transported to a facility in transport container which includes a central monitoring station workspace, worksite equipment packages are connected for communications with the central monitoring station workspace, power supplies are connected from a cable room at the central monitoring station package and extended to gangboxes at the worksites to provide power to the worksites, and monitoring information is transmitted from remote sensors at the worksites to central monitoring station equipment and displayed for a monitoring technician. When response threshold criteria are met, the monitoring technician notifies response personnel to respond to a worksite.

Embodiments of varying scope are described herein. In addition to aspects and advantages described in this summary, further aspects and advantages will become apparent by reference to the drawings and detailed description.

BRIEF DESCRIPTION OF THE DRAWINGS

FIG. 11 is a simplified partial sectional top view similar to FIG. 6, with roof deck removed to show detail of a lifting frame structure of the transport container.

FIG. 12 is an enlarged partial sectional side view of a lifting ear located on the exterior roof area of the transport container and taken generally along line A-A in FIG. 11.

FIG. 13 is an isolation side view of the lifting ear shown in FIG. 12, with other structural members omitted.

FIG. 14 is an isolation top view of a base plate shown generally in FIG. 12.

DETAILED DESCRIPTION OF THE INVENTION

In the following detailed description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Figure 1:
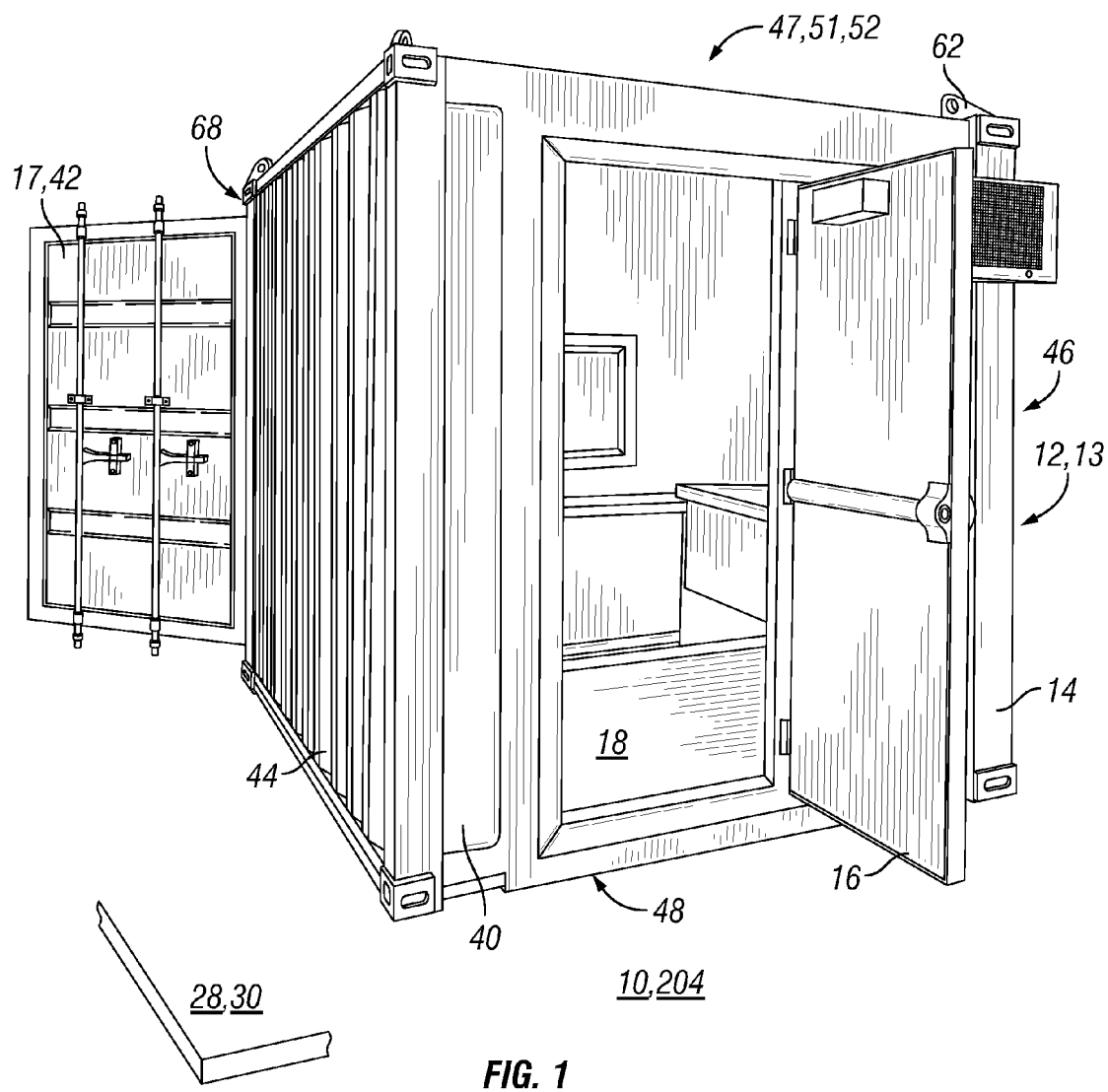
FIG. 1 is a front perspective view of apparatus for monitoring a plurality of worksites according to an embodiment, showing an exterior of a transport container having a front door open and a central monitoring station workspace defined in the interior thereof.
Figure 2:
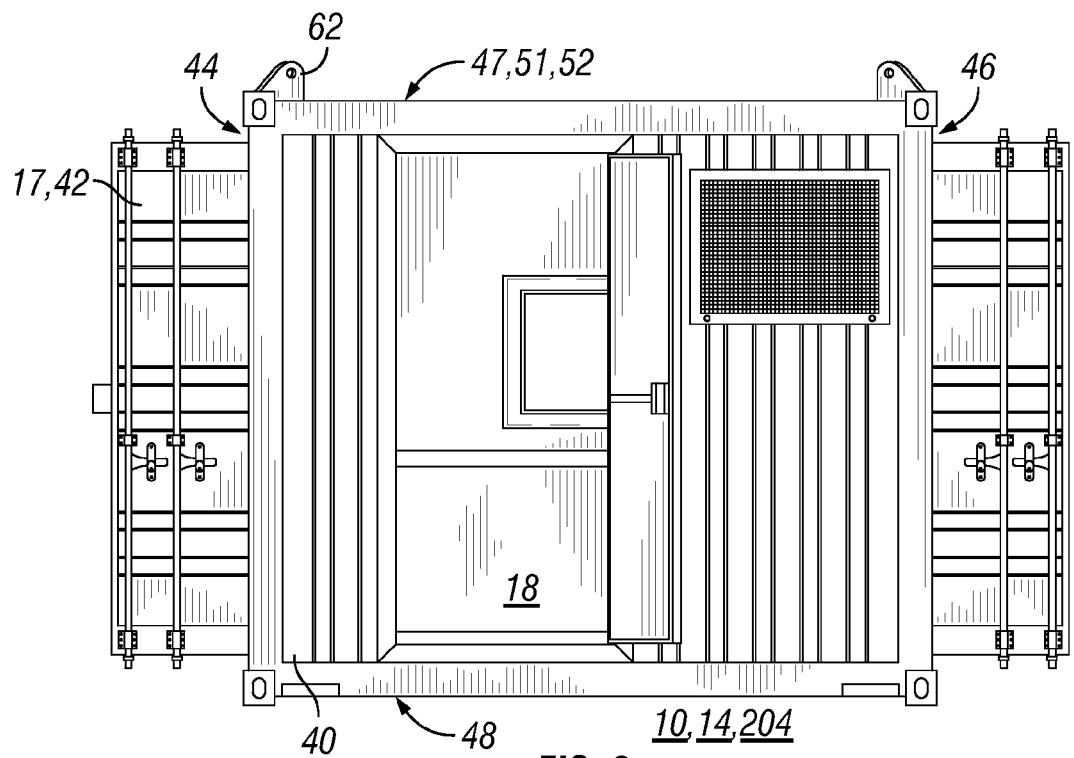
FIG. 2 is a front elevation similar to FIG. 1.

FIG. 1 is a front perspective view of apparatus 10 for monitoring a plurality of worksites 20,24 (see FIG. 9) according to an embodiment. FIG. 1 shows apparatus 10 including a transport container 14 having an exterior 12. Transport container 14 has a set of exterior walls 13. A front door 16 is open and a central monitoring station workspace 18 defined in the interior thereof. FIG. 2 is a front elevation similar to FIG. 1.

Figure 9:
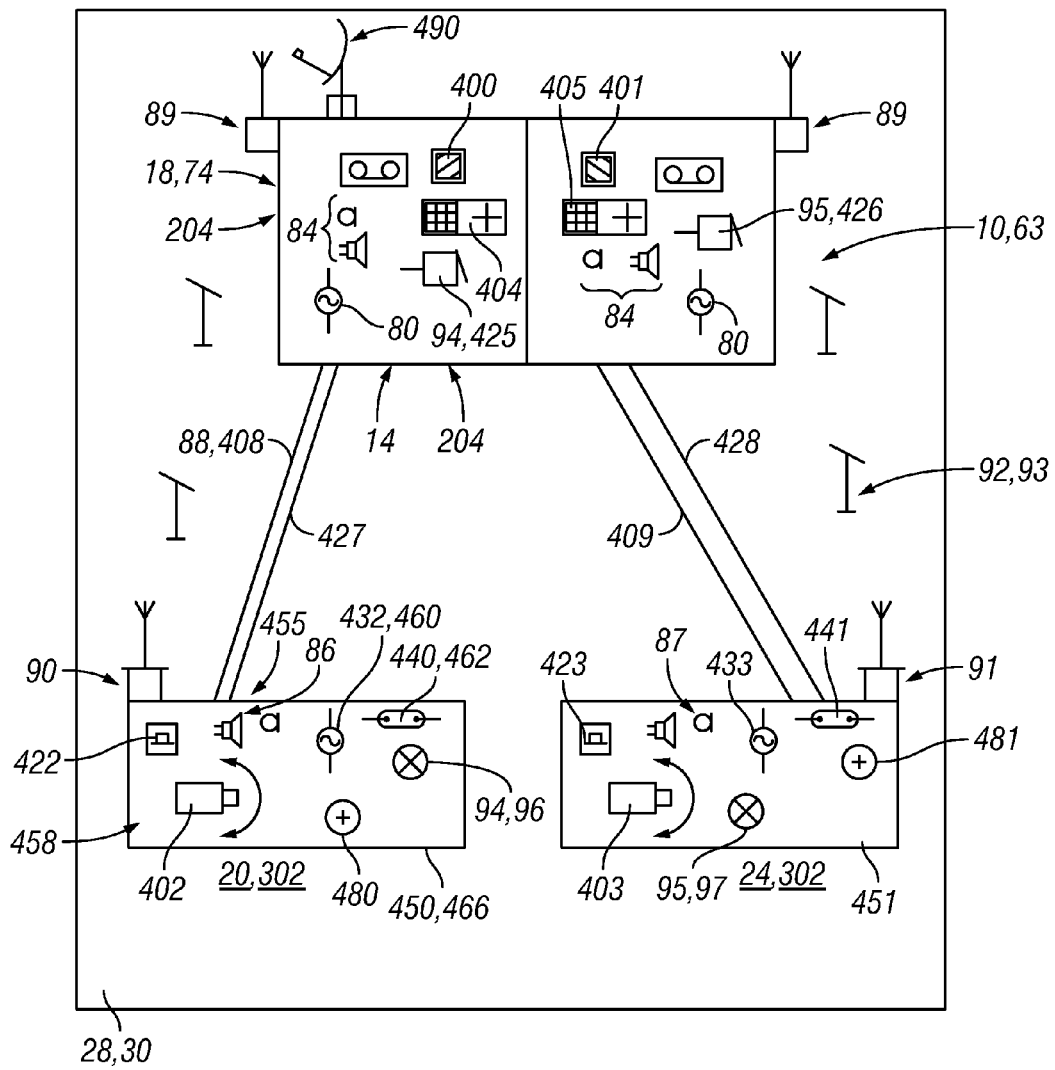
FIG. 9 is a simplified schematic illustration showing apparatus for monitoring a plurality of worksites according to an embodiment.

Referring to FIG. 9, apparatus 10 is adapted for monitoring a plurality of worksites 20,24 located at a common industrial facility 28 (see FIG. 9). In the specific embodiment illustrated in FIG. 9, the facility 28 is an offshore facility 30 for the production of petroleum, of the type commonly referred to as "offshore rigs" or "offshore platforms". It will be understood that an offshore facility 30 can include floating vessels, semi-submerged vessels, submerged vessels, work barges, work boats, floating production systems (FPS), and need not be fixed relative to the earth. It will also be understood that facility 28 is intended to include any facility, including both land and sea facilities, where work is to be performed at worksites 20,24 by workers (not shown) such as laborers and skilled tradesmen. In the specific embodiment shown in FIG. 9, the offshore facility 30 is an FPS having a plurality of worksites 20,24 each including a confined space 302 (see FIG. 15) such as an interior of a spar or tank 304. As used herein, "confined space" includes any worksite where egress by a worker from a potentially dangerous condition is limited by a restriction. Examples of restrictions are doorways, hatches, ladders, vertical exit hatches, crawl spaces, scaffolding, suspended platforms, walls, or any other condition which limits egress by a worker. As used herein, "confined space" includes any worksite where ingress by rescue personnel to remove a worker from a potentially dangerous condition is limited by a restriction. Examples of restrictions would be doorways, hatches, ladders, vertical exit hatches, crawl spaces, scaffolding, suspended platforms, walls, or any other condition which limits ingress by a rescue personnel. Returning to FIG. 9, it will be understood that each worksite 20,24 includes a confined space 302, and each confined space 302 presents a danger to workers laboring therein at least because of an access limitation relating thereto.

Referring to FIG. 9, apparatus 10 for monitoring a plurality of worksites 20,24 includes a central monitoring station package 204 and a plurality of worksite equipment packages 450, 451. Central monitoring station package 204 includes central monitoring station equipment 208,212 housed in a transport container 14. Transport container 14 is configured to be transported to the offshore facility 30 via a suitable movable transport (not shown). It will be understood any suitable mode of transportation can be used for transporting the transport container 14 such as, for example, an offshore supply vessel, boat, or ship, or a suitable flatbed truck. Referring to FIG. 1, transport container 14 has an exterior 12 defined by cooperation of a set of exterior walls 13. More particularly, transport container 14 has a set of exterior walls 13 which include a front wall 40 and a rear wall 42. The set of exterior walls 13 also includes an elongated first side 44 and an oppositely facing elongated second side 46 each extending between front wall 40 and rear wall 42 in perpendicular relation thereto. The set of exterior walls 13 also includes a generally planar roof 47 and a bottom 48 extending there between. Both the roof 47 and bottom 48 are generally formed of flat steel plate 49. Transport container 14 at roof 47 includes a roof deck 51 formed of the flat steel plate 52. Transport container 14 beneath roof deck 51 includes a lifting frame structure 54 (see FIG. 11-14). Lifting frame structure 54 includes a tubular upright 56 disposed at each outer corner 58. Lifting frame structure 54 includes a pair of welded cross-members 60 located immediately beneath the roof deck 51 and supporting the same intermediate a set of peripheral beams (not shown). It will be understood that the peripheral beams are located at top and bottom and extend in the horizontal direction between respective uprights 56 and are welded to a base plate 59. Each base plate 59 in turn is welded to a respective upright 56 and lifting ear 62, as well as cross-member 60 (see FIG. 12). Referring to FIG. 11, it will be understood that opposite ends of cross-member 60 are joined in fixed integral relation to a respective base plate 59 joined in turn to upper ends 57 of a respective upright 56 by suitable weld seams. The lifting ear 62 is joined in integral fixed relation with each of the spaced ends of each cross-member 60 at the intersection of the same with the base plate 59 and upper end 57 of each upright 56. In the illustrated embodiment, each lifting ear 62 is joined to the respective cross-member 60 and base plate 59 by suitable weld seams below the roof deck 51 (not shown in FIG. 11). The roof deck 51 thus includes a set of slots (not shown) through which the four lifting ears 62 protrude, and the resulting gap between the roof deck 51 and each lifting ear 62 is filled in an integral manner by being joined together by suitable weld seams. The lifting frame structure 54 provides sufficient strength such that transport container 14 is compliant with API (American Petroleum Institute) Standard RP2A for offshore dynamic lifting and Structural Welding Code Standard AWS-D1.1. It will be understood that apparatus 10 thus includes the transport container 14 which has a lifting frame structure 54 configured to support the loaded transport container 14 when engaged by a suitable hoist (not shown) to transfer the transport container 14 from a movable transport (not shown) to a stationary position at a central monitoring location 63 at an offshore facility 30.

Figure 10:
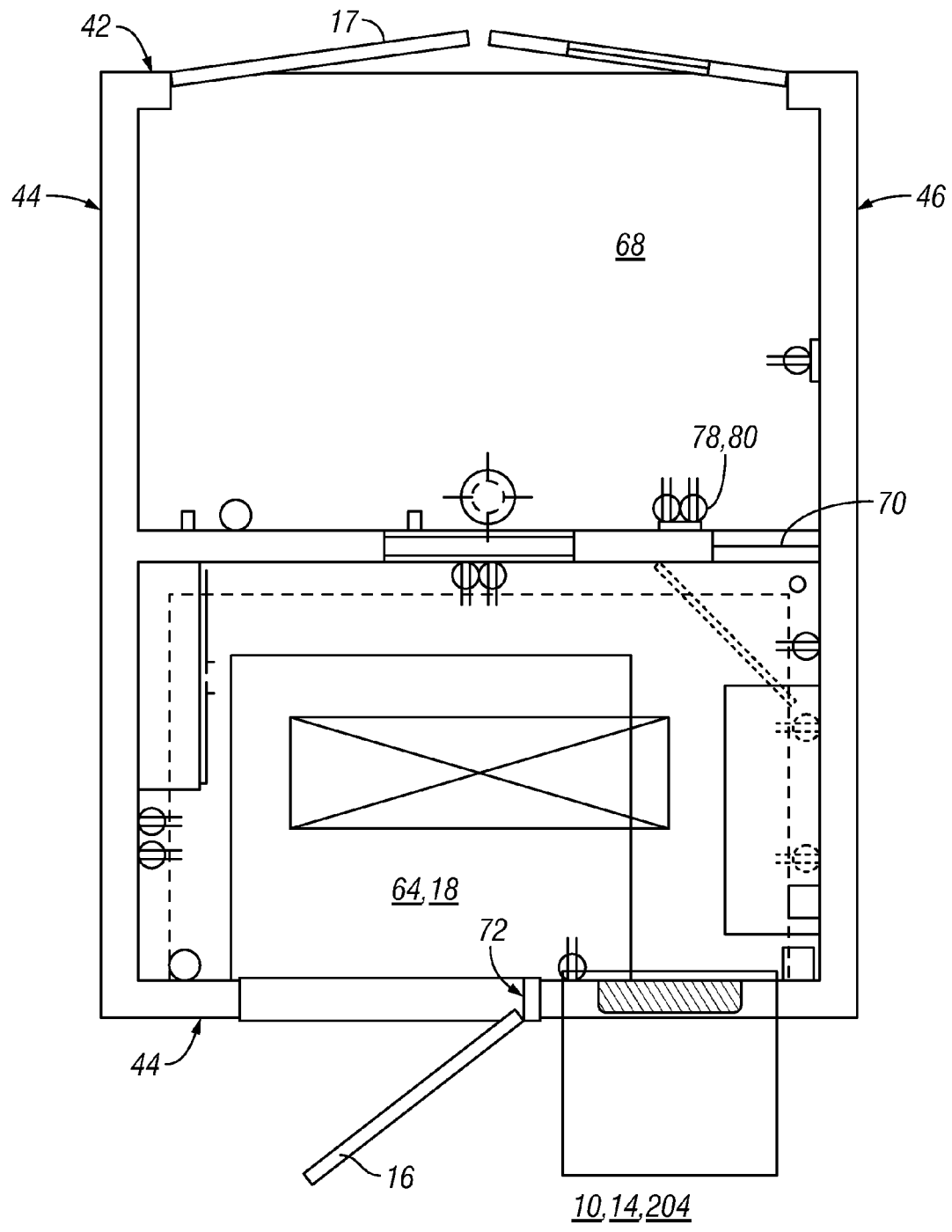
FIG. 10 is a simplified top plan view of an interior of a transport container shown generally in FIG. 1 and having a central monitoring station workspace and cable room defined therein.

Referring to FIG. 10, transport container 14 of central monitoring station package 204 of apparatus 10 has an interior 64 defined by cooperation of the set of exterior walls 13. Central monitoring station package 204 includes a central monitoring station workspace 18 defined in the interior 64 of transport container 14. Central monitoring station package 204 includes a cable room 68 defined in interior 64 of transport container 14. Cable room 68 is adjacent to central monitoring station workspace 18 on an opposite side of an interior dividing wall 70. In the specific embodiment illustrated, cable room 68 is a Class I, Division I space suitable for being located in an environment containing flammable gases. Also, in the specific embodiment illustrated, central monitoring station workspace 18 is a Class I, Division II space suitable for being located in an area classified as Class I, Division II. It will be understood that, in other embodiments, central monitoring station workspace 18 can be a Class I, Division II space suitable for being located in an area classified as Class I, Division I. It will be understood that, in other embodiments, central monitoring station workspace 18 can be an unclassified space.

The transport container 14 at front wall 40 includes the front door 16. The front wall 40 has a doorway 72 which is suitable to permit ingress by a monitoring technician into the central monitoring station workspace 18 from an external environment outside the transport container 14 at the central monitoring location 63. Front door 16 is a weather-resistant door having a heavy weather seal which seals any gaps between front door 16 and a surrounding front doorway 72 and thus prevents entry of water into the central monitoring station workspace 18. Interior 64 at least in the central monitoring station workspace 18 is sufficiently water-resistant to prevent more than an insubstantial amount of water from the exterior environment when front door 16 is closed. Interior 64 of transport container 14 is sufficiently waterproof to avoid entry of water which would damage electronic components of central monitoring station equipment 74 located therein. The central monitoring station workspace 18 has interior dimensions which are at least sufficient to accommodate therein a monitoring technician to operate the central monitoring station equipment 74. In the specific embodiment shown in FIG. 10, the central monitoring station workspace 18 is sufficiently large to accommodate a desk chair (not shown) for the monitoring technician to work in a seated position while operate the central monitoring station equipment 74. In the specific embodiment shown in FIG. 10, the central monitoring station workspace 18 includes a built-in desk mounted around the interior walls to support the central monitoring station equipment 74 which is operated by the monitoring technician. In the specific embodiment shown in FIG. 10, the central monitoring station workspace 18 also includes built-in cabinets and shelves mounted around the interior walls to support central monitoring station equipment 74. Interior dividing wall 70 is spaced from front wall 40 and extends in spaced, perpendicular relationship thereto.

Figure 3:
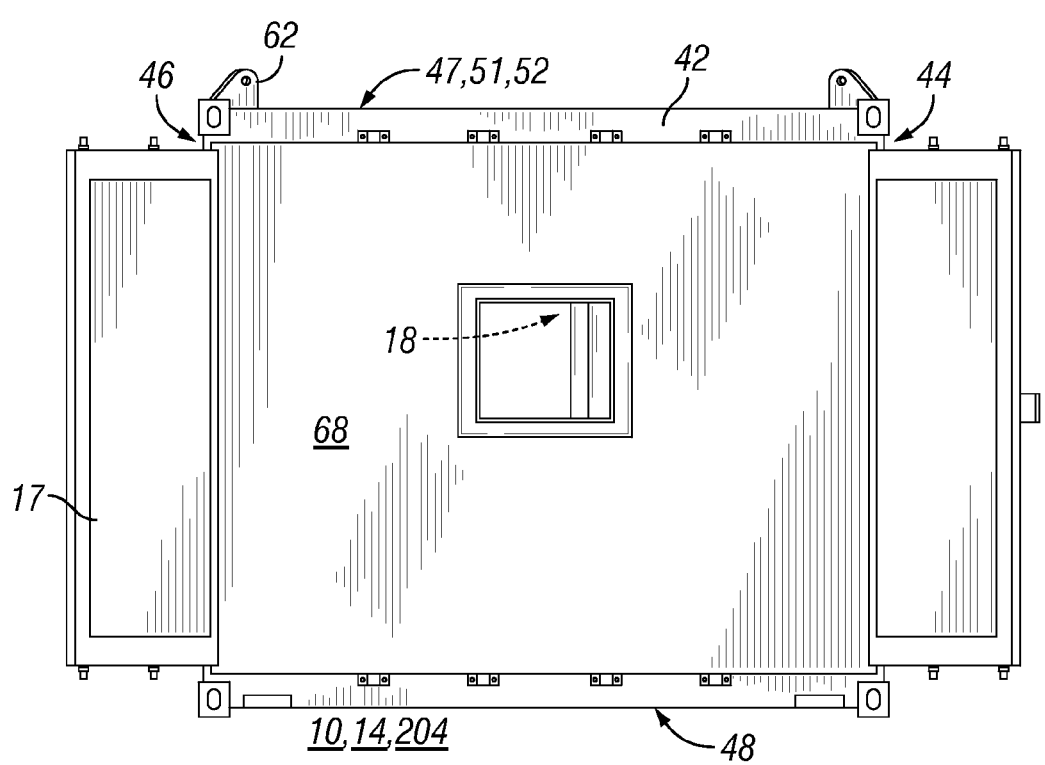
FIG. 3 is a rear elevation of apparatus for monitoring a plurality of worksites according to an embodiment, showing an exterior of a transport container having a pair of rear doors open and a cable room defined in the interior thereof.
Figure 4:
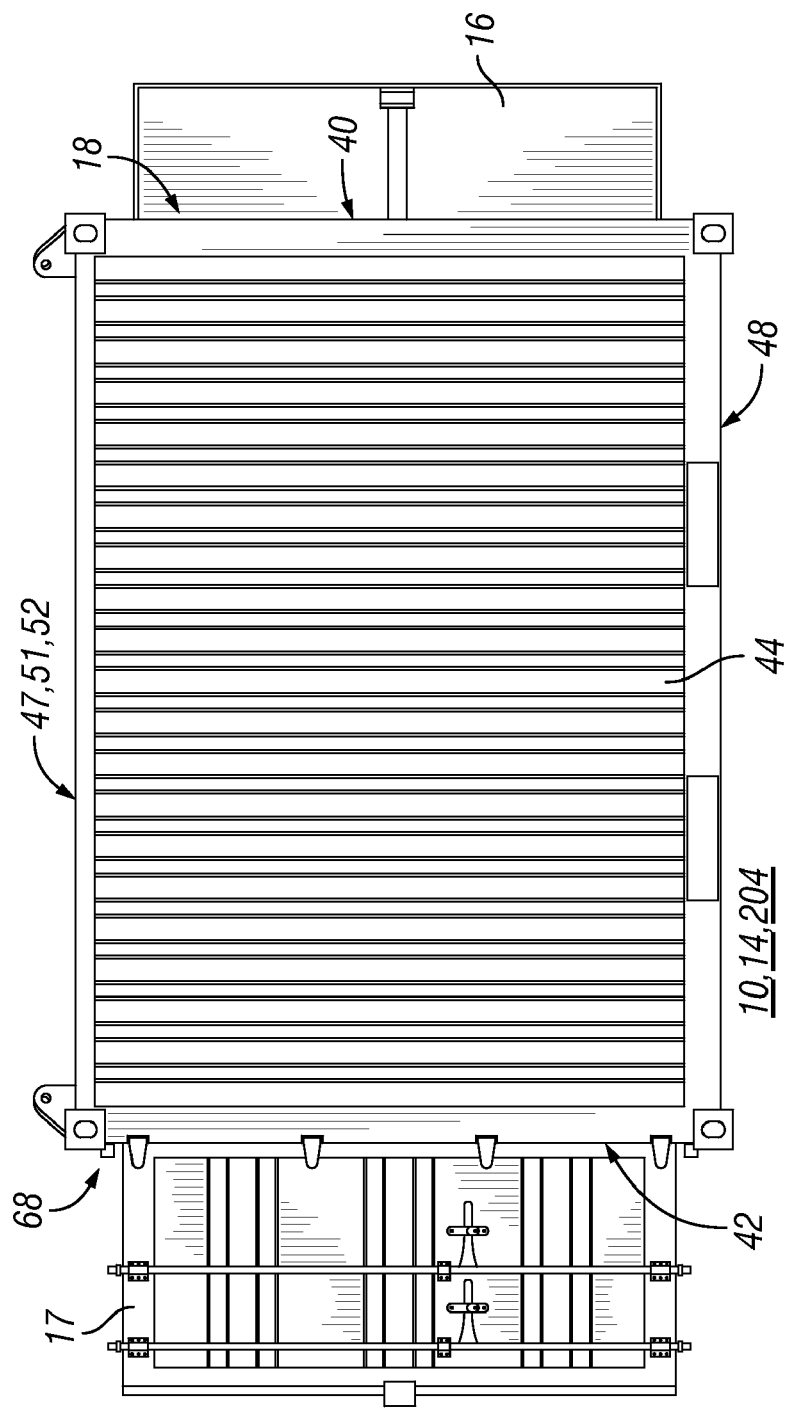
FIG. 4 is a first side elevation of apparatus for monitoring a plurality of worksites according to an embodiment, taken generally along line 4-4 in FIG. 2.
Figure 5:
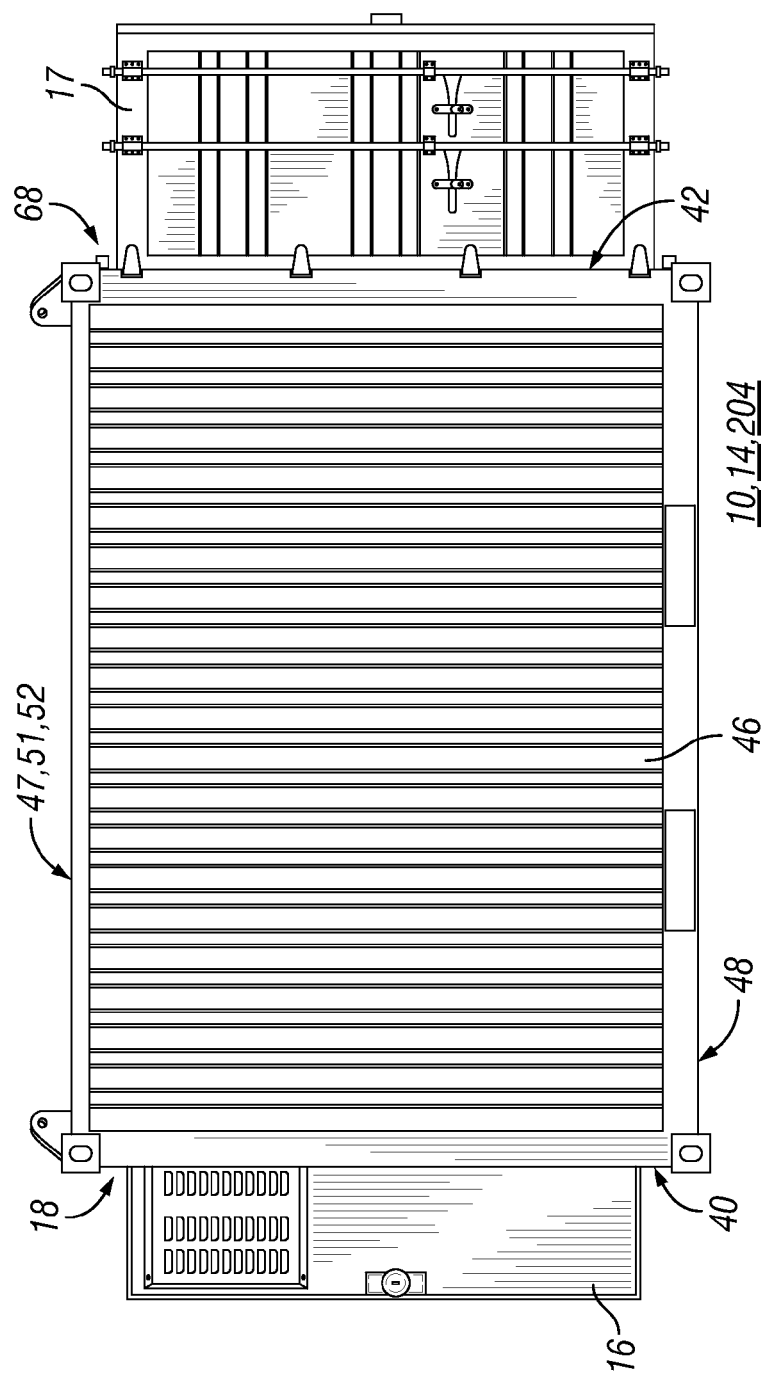
FIG. 5 is a second side elevation of apparatus for monitoring a plurality of worksites according to an embodiment, taken generally along line 5-5 in FIG. 3.
Figure 6:
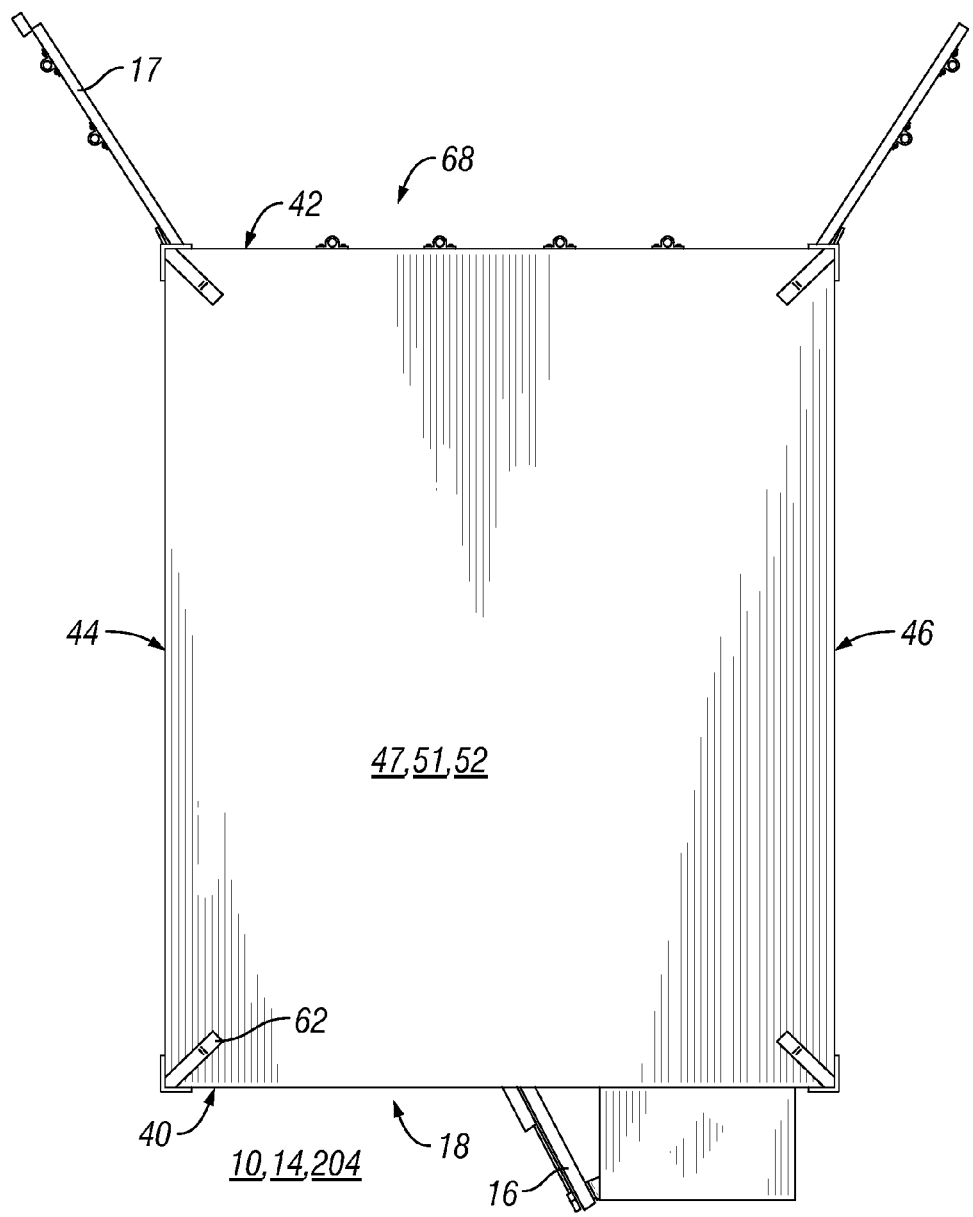
FIG. 6 is a top plan view of apparatus for monitoring a plurality of worksites according to an embodiment, taken generally along line 6-6 in FIG. 5.
Figure 7:
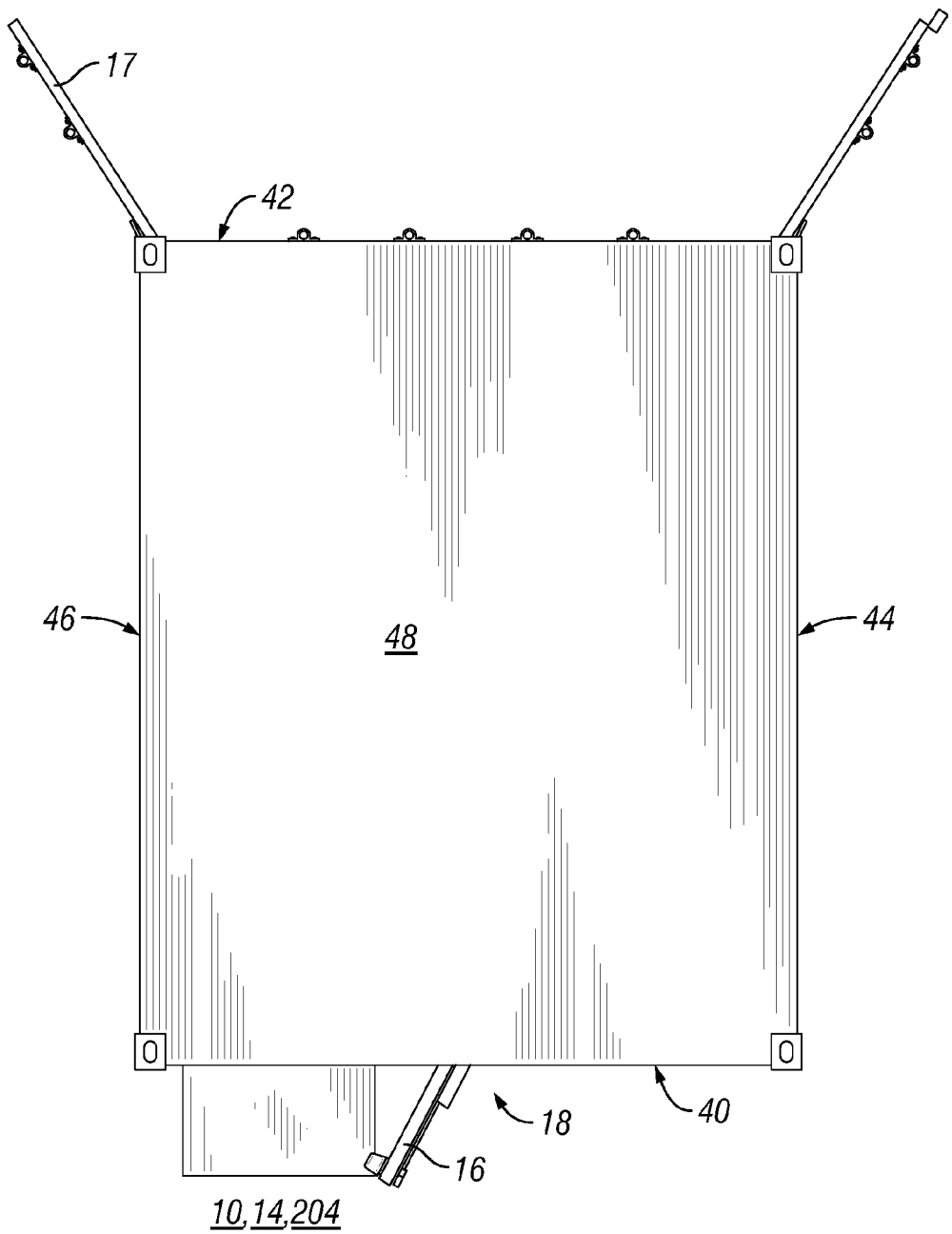
FIG. 7 is a bottom plan view of apparatus for monitoring a plurality of worksites according to an embodiment, taken generally along line 7-7 in FIG. 5.

Referring to FIG. 3, transport container 14 includes a pair of rear doors 17 which cooperate when closed to form a major portion of a rear wall 42. The rear doors 17 permit ingress by personnel into the cable room 68 from an external environment outside the transport container 14 at the central monitoring location 63. Cable room 68 is a weather-resistant room having non-sparking surfaces which comply with specifications for a Class I, Division I space containing flammable vapors. Cable room 68 also has a heavy weather sealant which seals any gaps and thus prevents entry of water into the central monitoring station workspace 18 and electrical system 78 of transport container 14. In cable room 68, interior 64 is sufficiently water-resistant to prevent more than an insubstantial amount of water from penetrating when rear doors 17 are open. Interior 64 of transport container 14 is sufficiently waterproof to avoid entry of water which would damage electronic components of central monitoring station equipment 74 located in central monitoring station workspace 18 and electrical system 78.

Referring to FIG. 10, the central monitoring station workspace 18 includes an electrical system 78 configured and disposed to provide suitable electrical power to operate the central monitoring station equipment 74. In the specific embodiment illustrated, all electrical fixtures of electrical system 78 in transport container 14 are rated as Class I, Division I devices. In one embodiment, all electrical fixtures in electrical system 78 of transport container 14 are rated at least as Class I, Division II devices. In the specific embodiment illustrated in FIG. 10, the electrical system 78 includes a 220 volt single phase power supply inlet receptacle (not shown). The power supply inlet receptacle is suitable to be connected to a stand alone electric generator (not shown) or to a facility power supply to provide power to electrical system 78 of transport container 14. In the specific embodiment illustrated in FIG. 10, the electrical system 78 includes a plurality of 110 volt outlets 80. Outlets 80 located in central monitoring station workspace 18 are suitable to provide power to central monitoring station equipment 74. Outlets 80 located in cable room 68 are suitable to be connected with heavy duty power cables 427,428 to safely deliver electrical power to worksite equipment packages 450,451 at the plurality of worksites 20,24. Electrical system 78 includes suitable interior lighting 81. In the specific embodiment illustrated in FIG. 10, the interior lighting 81 is provided by a fluorescent fixture. Electrical system 78 also includes an air conditioning unit 82 which is at least compliant with a Class 1 Division II standard and thus is suitable for use in an environment potentially containing flammable vapors.

Figure 16:
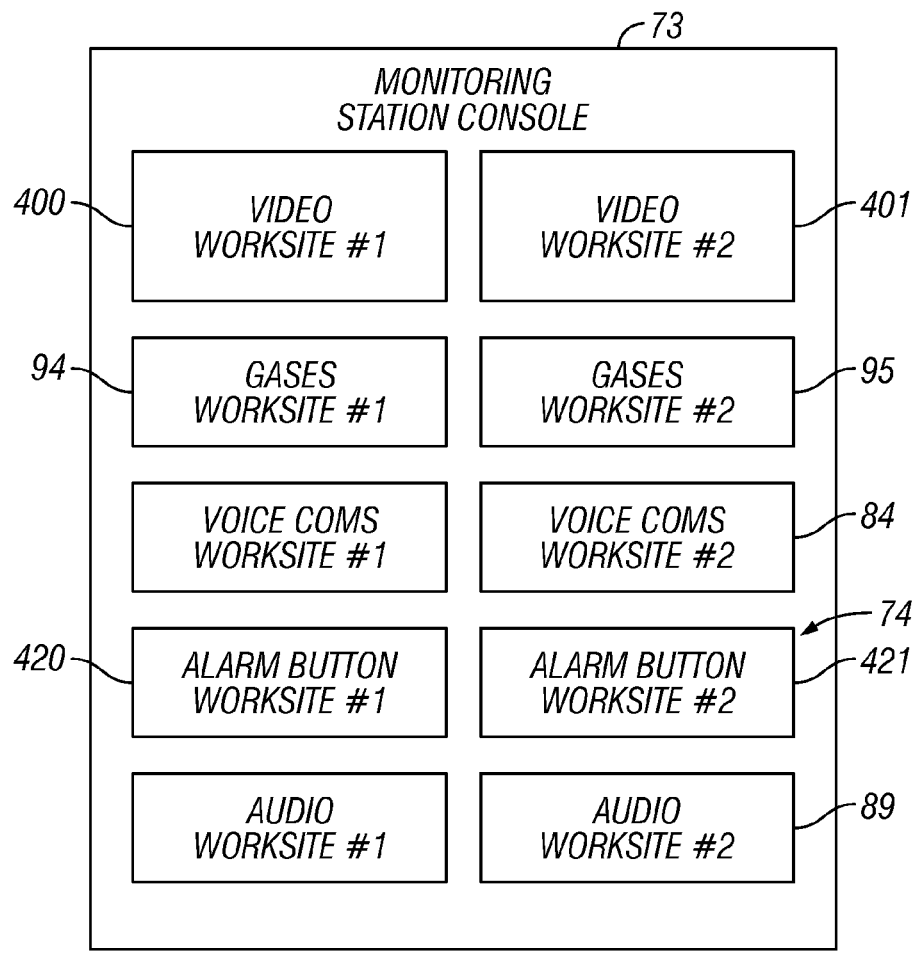
FIG. 16 is a simplified schematic illustration showing elements of a monitoring technician console of central monitoring station equipment of apparatus for monitoring a plurality of worksites as generally shown in FIG. 10.

Referring to FIG. 16, the central monitoring station equipment 74 includes a monitoring technician console 73. Monitoring technician console 73 includes video communications displays 400,401, gas detection receiver 94,95, communications transceiver 84, external satellite communications interface (not shown), manual alarm receivers 420,421, and wireless communications transceiver 89. Referring to FIG. 9, the central monitoring station equipment 74 includes at least one communications transceiver 84 of a suitable communications platform 85. The at least one communications transceiver 84 is suitable for two-way communication between the monitoring technician remotely located at the central monitoring location 63 and worksite personnel located at each of the plurality of worksites 20,24 being monitored. It will be understood that any suitable communications platform can be used. In the specific embodiment illustrated in FIG. 9, the communications platform 85 includes at least one communications transceiver 84 configured for two-way communication with a plurality of portable worksite communications transceivers 86,87 respectively located at the plurality of worksites 20,24. In the specific embodiment illustrated in FIG. 9, a suitable commercially available communications platform 85 is a Model Number ES1665AG Communications System manufactured by Comtrol of Irwin, Pa. The Number ES1665AG Communications System is a communications platform 85 which is compliant with Class I, Division II standards for use in an environment where flammable vapors may be present. In the specific embodiment illustrated in FIG. 9, it will be understood that the communication platform 85 includes a plurality of wired cable connections 88. Each wired cable connection 88 extends from the at least one communications transceiver 84 located at central monitoring station workspace 18 to at least a respective one of the plurality of worksites 20,24. It will be understood that, in other embodiment, communications platform 85 can also be wireless.

Referring to FIG. 9, the central monitoring station equipment 74 includes at least one wireless communications transceiver 89 of a suitable of a suitable wireless communications platform 90. The at least one wireless communications transceiver 84 is suitable for at least wireless two-way communication between the monitoring technician remotely located at the central monitoring location 63 and worksite personnel located at each of the plurality of worksites 20,24 being monitored. It will be understood that any suitable wireless communications platform can be used. In the specific embodiment illustrated in FIG. 9, the at least one wireless communications transceiver 89 includes a dedicated two-way radio configured for dedicated communication with a portable worksite communications wireless handsets 90,91 respectively located at the plurality of worksites 20,24. In the specific embodiment illustrated in FIG. 9, a suitable commercially available two-way wireless communications platform 89 is a Model HT750 Radio Communications System manufactured by Motorola. The wireless communications platform 89 is compliant with Class I, Division II standards for use in an environment where flammable vapors may be present. In the specific embodiment illustrated in FIG. 9, it will be understood that the wireless communication platform 89 includes a plurality of relay antennas 92. Each of the relay antennas 92 includes and is supported by a magnetic base (not shown) at a respective relay antenna location 93. The magnetic base (not shown) of each relay antenna 92 is temporarily affixed to metallic structure (not shown) while a worksite is being used, and is relocated when work at a worksite is completed.

Referring to FIG. 9, the central monitoring station equipment 74 includes a plurality of gas detection receiver 94,95 corresponding to the worksites 20,24 being monitored. Each gas detection receiver 94,95 is configured for communication with a corresponding worksite gas detection sensor and transmitter 96,97 located at a corresponding worksite 20,24. It will be understood that the gas detection receiver 94,95 can communicate with the corresponding worksite gas detection sensor and transmitter 96,97 over any suitable wireless or wired cable communications linkage. In the specific embodiment shown in FIG. 9 and FIG. 15, the communications linkage is wireless. A suitable commercially available product is an Otis OI-WF752 wireless relay/alarm board located at the central monitoring station equipment 74 and functioning as a dedicated gas detection receiver 94,95. A suitable compatible commercially available product is an Otis OI-WF690 wireless sensor located at a respective worksite 20,24 and functioning as gas detection sensor and transmitter 96,97. It will be understood that the Otis OI-WF690 wireless sensor is configured for wireless communication via radio frequency transmissions of monitored gas conditions to the corresponding Otis OI-WF752 wireless relay/alarm board located at the central monitoring station equipment 74. It will be understood that the gas detection receiver 94,95 and gas detection sensor and transmitter 96,97 are compliant with Class I, Division II standards for use in an environment where flammable vapors may be present.

Referring to FIG. 9, the central monitoring station equipment 74 includes a plurality of video communications displays 400,401 corresponding to the worksites 20,24 being monitored. Each video communications display 400,401 is configured for communication with a corresponding worksite thermal imaging video camera 402,403 located at a corresponding worksite 20,24. In the specific embodiment illustrated, each thermal imaging video camera 402,403 is a movable PTZ (pan-tilt-zoom) camera controlled by the monitoring technician via a respective camera controller 404, 405. Also, in the specific embodiment shown in FIG. 9, each video communications display 400,401 is associated with a respective video storage device 406,407. In the specific embodiment shown, video storage device 406,407 is a VCR. It will be understood that any suitable video storage device, such as a DVR or RAID storage, can be used. Likewise, it will be understood that internet protocol compatible cameras can be used instead of conventional CCTV video cameras wired by coaxial cable. It will be understood that the video cameras can communicate with the central monitoring station equipment 74 in any suitable manner via a wired cable or wireless communications linkage. In the specific embodiment illustrated, the communications linkage includes a wired cable connection 408,409 extending from the central monitoring station equipment 74 to the respective worksite thermal imaging video camera 402,403 at each worksite 20,24. A suitable commercially available thermal imaging video camera is the Model 4057985 Thermal imaging Camera available from Drager Safety of Luebeck, Germany. It will be understood that the worksite thermal imaging video camera 402,403 is compliant with Class I, Division II standards for use in an environment where flammable vapors may be present. Any compatible camera controller 404,405 and video display 400, 401 can be used. In the illustrated embodiment, the video display 400,401 is a display monitor. It will be understood that suitable fixed cameras, rather than PTZ cameras, can be used.

Referring to FIG. 9, the central monitoring station equipment 74 includes an external communications link 490. In the specific embodiment illustrated, external communications link 490 is a wireless satellite communications link to a satellite transceiver which directs communications transmissions between the central monitoring station workspace 18 and a compatible communications transceiver located at a distant supervisory facility, such as an office, which is remote from the offshore facility 30. It will be understood that any suitable distance communications platform can be utilized as an external communications link 490. Such a link can transmit voice and data between central monitoring station workspace 18 and a compatible communications transceiver located at the distant supervisory facility. In the specific embodiment shown in FIG. 9, the external communications link 490 includes a satellite transceiver. A suitable commercially available third party service is the Our Connect™ satellite communication service provided by an iDirect very small aperture terminal 11 and available from Infosat Communications of Alberta, Canada and U.S. affiliate Able Infosat Communications of Houston, Tex.

Referring to FIG. 9, the central monitoring station equipment 74 includes a plurality of manual alarm receivers 420, 421 each corresponding to a respective manual alarm button 422,423 located at each worksite 20,24. The manual alarm buttons 422,423 communicate with the manual alarm receivers 420,421 of the central monitoring station equipment 74 to provide a manual alarm to the monitoring technician from worksite personnel at each worksite 20,24.

Referring to FIG. 9, each of the portable worksite equipment packages 450,451 of apparatus 10 includes a plurality of worksite electrical power supplies 425,426 corresponding to respective worksites 20,24. The plurality of worksite electrical power supplies 425,426 include a suitable heavy duty power cables 427,428 extending from each worksite 20,24 to a respective outlet 80 of electrical system 78 in cable room 68 of transport container 14. In the specific embodiment illustrated, electrical system 78 includes a 220 volt single phase input receptacle connected to a suitable external electric power source such as, for example, a stand alone generator (not shown) or a facility power source (not shown) of offshore facility 30. It will be understood that the same electrical system 78 provides power to central monitoring station package 204 for the central monitoring station equipment 74 and central monitoring station workspace 18, as well as for cable room 68 and worksites 20,24 via cable connections 427,428 to outlets 80 located therein. In the specific embodiment illustrated, electrical system 78 includes suitable 110 volt single phase output passed to worksite gangboxes 432,433 via each cable connection 427,428 from outlets 80. Each heavy duty cable connection 427,428 is suitably grounded and connects to a portable, grounded gang box 432,433 located at each worksite 20,24. Each gang box 432,433 includes suitable 110 volt outlets to provide power for worksite conditioning equipment 435,436, as well as for any remote monitoring sensor 458 and communications equipment of communications platform 85 or wireless communications platform 89 that requires the same. It will be understood that the worksite gang box 432,433 and cable connection 427,428 connected thereto are enclosed in a suitable enclosure which is compatible with operation of electrically powered equipment in a potentially flammable vapor environment, such as Class I, Division I.

Figure 15:
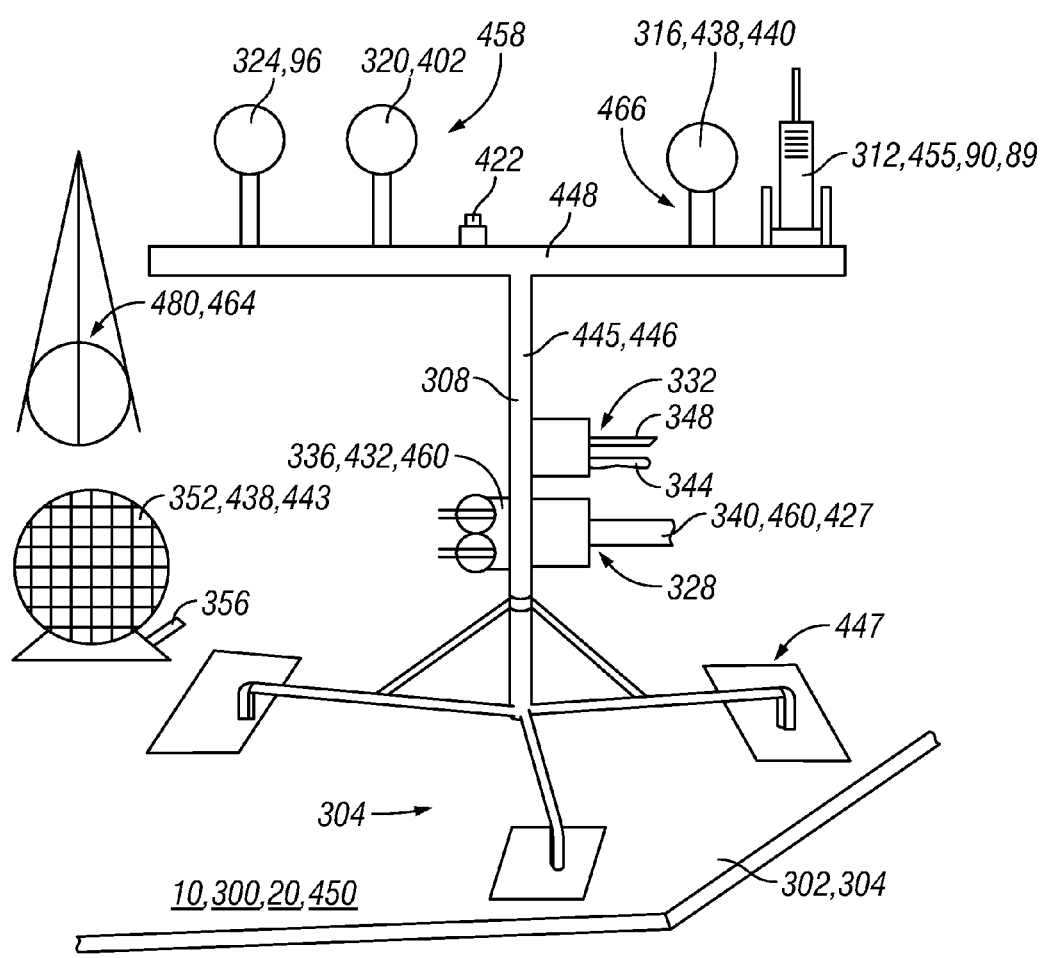
FIG. 15 is a simplified schematic illustration showing a worksite monitoring package according to an embodiment.

Referring to FIG. 9 and FIG. 15, each of the portable worksite equipment packages 450,451 of apparatus 10 includes a plurality of worksite conditioning equipment 438, 439 corresponding to the worksites 20,24. In the specific embodiment shown, the worksite conditioning equipment 438,439 includes worksite lights 440,441 suitable to provide adequate illumination of at least a portion of a worksite 20,24. Each worksite light 440,441 is powered by a suitable grounded connection (not shown) to an outlet at respective worksite gang box 432,433. It will be understood that the worksite lights 440,441 are compliant with Class I, Division II standards for use in an environment where flammable vapors may be present. Any suitable Class I, Division II compliant lighting can be used. According to an embodiment, worksite lights 440,441 are positioned to provide a level of worksite illumination which is sufficient to provide a safe working environment in an illuminated area or portion of the worksite 20,24. In the specific embodiment shown in FIG. 9 and FIG. 15, the worksite lights 440,441 are Phoenix Model Number: FS1570MH-120V lights available from Phoenix Lighting of Milwaukee, Wis.

Referring to FIG. 15, each of the portable worksite equipment packages 450,451 of apparatus 10 includes a plurality of worksite conditioning equipment 438,439 corresponding to the worksites 20,24. In the specific embodiment shown, the worksite conditioning equipment 438,439 includes worksite ventilation fans 443,444 suitable to provide adequate ventilation in at least a portion of a worksite 20,24. Each worksite ventilation fan 443,444 is powered by a suitable grounded connection to an outlet at respective worksite gang box 432, 433. It will be understood that the worksite ventilation fans 443,444 are compliant with Class I, Division II standards for use in an environment where flammable vapors may be present. Any suitable Class I, Division II compliant ventilation equipment can be used. In the specific embodiment shown in FIG. 15, the ventilation fans 443,444 are Model Number ASI-JF20 fans available from Texas Pneumatics of Reagan, Tex. Depending upon the particular worksite, a suitable alternative is the Model Number ASI-2900 fan available from Air Systems International of Chesapeake, Va.

Referring to FIG. 9, each of the portable worksite equipment packages 450,451 of apparatus 10 includes a plurality of worksite rescue equipment 480,481 prepositioned at the worksites 20,24. In the specific embodiment shown, the worksite rescue equipment 480,481 can include suitable vertical rescue rope, a tripod-type support suitable to support vertical rescue rope, body harness, and stretcher, back stabilizer board, breathing equipment such as SCBA equipment, and first aid supplies. It will be understood that the worksite rescue equipment 480,481 will include components prepositioned at each worksite 20,24 to enable response personnel to effectuate a rescue of worksite personnel. It will be understood that worksite rescue equipment 480,481 can include any suitable rescue equipment which is to be prepositioned at a worksite 20,24 as a safety precaution.

Referring to FIG. 15, each of the portable worksite equipment packages 450,451 of apparatus 10 includes a portable equipment support 445 located at each worksite 20,24. In the specific embodiment shown in FIG. 15, the portable equipment support 445 is a portable equipment stand 446. Portable equipment stand 446 has a base 447 and an elevated support arm 448. It will be understood that portable equipment stand 446 is used in conjunction with a plurality of suitable clamps to support remote monitoring sensors 458 and worksite conditioning equipment 438,439 such as worksite lights 440,441. It will be understood that portable equipment stand 446 can support gang box 432,433 in a grounded condition.

Referring to FIG. 9, apparatus 10 includes a plurality of portable worksite equipment packages 450,451. Each portable worksite equipment package 450,451 is stationed at a corresponding one of the plurality of worksites 20,24. It will be understood that each portable worksite equipment package 450,451 includes suitable communications equipment 455, remote monitoring sensors 458, power supply 460, worksite conditioning equipment 462, worksite rescue equipment 464, and worksite equipment support hardware 466. It will be understood that communications equipment 455 can include any communications equipment suitable to provide at least two-way communications between worksite personnel and the monitoring technician remotely located in the central monitoring station equipment 74. In the specific embodiment illustrated in FIG. 9, the communications equipment 455 includes the portable worksite communications transceivers 86,87 of communications platform 85 located at respective worksites 20,24 and configured for two-way communication with the at least one communications transceiver 84 located at the central monitoring station equipment 74. In the specific embodiment illustrated in FIG. 9, the communications equipment 455 includes the portable worksite communications wireless handsets 90,91 of two-way wireless communications platform 89 located at respective worksites 20,24 and configured for wireless two-way communications with the at least one wireless communications transceiver 89 located at central monitoring station equipment 74. It will be understood that remote monitoring sensors 458 can include any suitable remote monitoring sensors suitable to monitor a condition at a worksite 20,24 and to provide worksite monitoring information for transmission in remote transmissions to receiving components of the central monitoring station equipment 74 located at the central monitoring station workspace 18 for display to the monitoring technician. It will be understood that remote monitoring sensors 458 can include, for example, any suitable sensor and transmission components of a worksite thermal imaging video camera 402,403 located at a corresponding worksite 20,24. It will also be understood that remote monitoring sensors 458 can include, for example, any suitable sensor and transmission components of a worksite gas detection sensor and transmitter 96,97 located at a corresponding worksite 20,24. It will be understood that remote monitoring sensors 458 can include, for example, any suitable sensor and transmission components located at a worksite 20,24 for transmitting monitoring information to components of central monitoring station equipment 74 located at the central monitoring station workspace 18 for display to the monitoring technician. It will also be understood that remote monitoring sensors 458 can include, for example, any suitable sensor and transmission components of a worksite manual alarm buttons 422,423 operable to transmit a manual alarm activated by worksite personnel to manual alarm receivers 420,421 of central monitoring station equipment 74 located at the central monitoring station workspace 18 for display to the monitoring technician. It will be understood that power supply 460 can include any suitable worksite power source suitable to supply electrical power for operation of equipment at the worksite. It will be understood that power supply 460 can include, for example, worksite gang box 432,433 and power cable connection 427,428 connected thereto and suitable to supply power at a respective worksite 20,24. It will be understood that worksite conditioning equipment 438,439 can include any worksite conditioning equipment suitable to provide a conditioning effect on a condition at a worksite 20,24. It will be understood that worksite conditioning equipment 438,439 can include, for example, worksite lights 440,441 suitable to provide adequate illumination of at least a portion of a worksite 20,24. It will be understood that worksite conditioning equipment 438,439 can include, for example, worksite ventilation fans 443,444 suitable to provide adequate ventilation in at least a portion of a worksite 20,24. It will be understood that worksite equipment support hardware 466 can include any support hardware suitable to support any of the other worksite equipment package 450,451 components, such as communications equipment 455, remote monitoring sensors 458, power supply 460, worksite conditioning equipment 438,439, and worksite rescue equipment 464, in a functional position at worksite 20,24. It will be understood that worksite equipment support hardware 466 can include portable equipment support 445 and related brackets located at each worksite 20,24.

Figure 8:
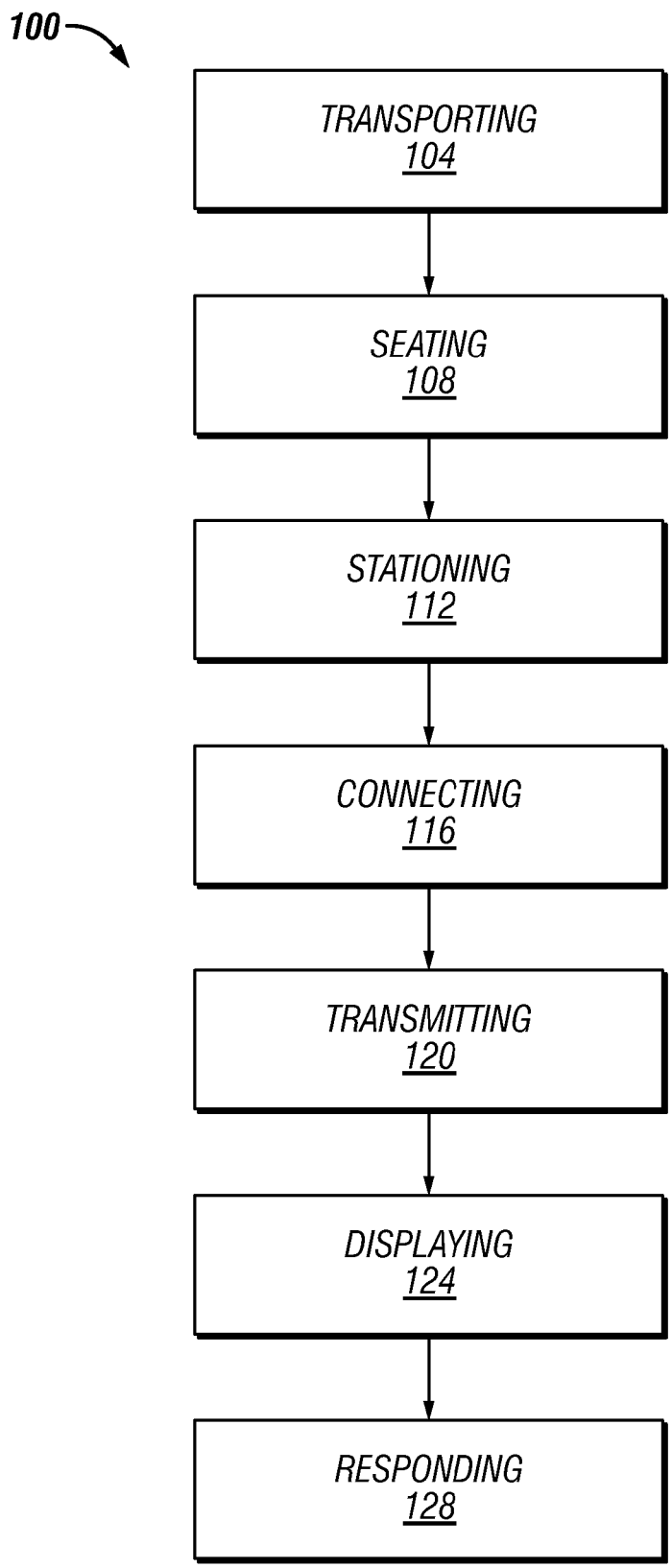
FIG. 8 is a simplified flow chart showing a method for monitoring a plurality of worksites according to an embodiment.

FIG. 8 shows a method 100 for monitoring a plurality of worksites according to an embodiment. It will be understood that other embodiments (not shown) can omit or add steps, or can be described using different terminology, and perform the same functions as method 100 described herein. According to embodiments, method 100 is operable for monitoring a plurality of worksites, such as worksites 20,24 elsewhere described in connection with FIG. 9, where labor is performed by workmen, the plurality of worksites are being co-located at a facility such as, for example, an offshore facility.

Method 100 comprises Transporting 104. Transporting 104 includes transporting to the facility aboard a suitable movable transport a transportable monitoring system package, the transportable monitoring system package including a plurality of worksite monitoring equipment packages to be deployed at the worksites, the transportable monitoring system package including one central monitoring station package, the central monitoring station package including a transport container, the transport container having a set of container sides, the transport container having a waterproof interior defined intermediate the set of container sides, the central monitoring station package including central monitoring station equipment housed in the transport container, the central monitoring station equipment including moisture-sensitive electronic components housed in the waterproof interior, the waterproof interior defining a central monitoring station workspace, the central monitoring station workspace having interior dimensions which are at least sufficient to accommodate therein a monitoring technician to operate the central monitoring station equipment. It will be understood that the central monitoring station can include all of the equipment elsewhere described in this disclosure in connection with central monitoring station package 204, transport container 14, central monitoring station equipment 72 and central monitoring station workspace 18, and cable room 68, and any other suitable equipment elsewhere described or known.

Method 100 includes Seating 108. Seating 108 includes seating the transport container in a stationary position at a central monitoring location at the facility, the central monitoring location being remote from the worksites, the transport container having an entry door suitable to permit ingress by the monitoring technician into the central monitoring station workspace from an external environment, the external environment being outside the transport container at the central monitoring location.

Method 100 includes Stationing 112. Stationing 112 includes stationing at each worksite at least one of the worksite monitoring equipment packages, each of the worksite monitoring equipment packages including at least one remote monitoring sensor, the at least one remote monitoring sensor being operable to collect remote monitoring information at the respective worksite. The remote monitoring sensors can include any remote monitoring sensor such as remote monitoring sensors 458 elsewhere described herein. More particularly, the remote monitoring sensors can include but are not limited to, for example, a thermal imaging video camera 402,403, gas detection sensor and transmitter 96,97, and manual alarm button 422,423.

Method 100 includes Connecting 116. Connecting 116 includes connecting communication links between each remote monitoring sensor and the central monitoring station equipment, each communication link being suitable to transmit remote transmissions from a respective remote monitoring sensor to the central monitoring station equipment, the remote transmissions conveying the remote monitoring information.

Method 100 includes Transmitting 120. Transmitting 120 includes transmitting the remote transmissions over the communication links from the respective remote monitoring sensors to the central monitoring station equipment in a manner suitable to provide the remote monitoring information on a near real-time basis to the central monitoring station equipment.

Method 100 includes Displaying 124. Displaying 124 includes displaying by operation of the central monitoring station equipment the remote monitoring information received in the remote transmissions to inform the monitoring technician of same.

Method 100 includes Responding 128. Responding 128 includes responding when the monitoring technician identifies that the remote monitoring information meets a response threshold criteria by notifying responsible personnel to take corrective action relating to a worksite, the worksite corresponding to certain of the remote monitoring information meeting the response threshold criteria. The remote monitoring information can include but is not limited to, for example thermal image data of a worksite, gas detection data of a worksite, audio data of a worksite, voice communications data from a worksite, and manual alarm data from a worksite.

It will be understood that Method 100 can be practiced with limitations in addition to the limitations set forth in the preceding paragraphs. According to an embodiment, Method 100 is practiced wherein each of the worksite monitoring equipment packages includes at least one remote monitoring sensor selected from the following: a camera suitable to provide visual image data of a worksite; a gas detection instrument suitable to provide gas detection data of a worksite; an environmental microphone suitable to provide audio data of a worksite; a manual alarm button suitable to provide manual alarm signal data of a worksite, and a voice communications microphone associated with a worker located at a worksite and suitable to transmit voice communications from the worker.

It will be understood that Method 100 can be practiced with limitations in addition to the limitations set forth in the preceding paragraphs. According to an embodiment, Method 100 is practiced wherein each of the worksite monitoring equipment packages includes at least one worksite conditioning apparatus.

It will be understood that Method 100 can be practiced with limitations in addition to the limitations set forth in the preceding paragraphs. According to an embodiment, Method 100 is practiced wherein each of the worksite monitoring equipment packages includes at least one worksite conditioning apparatus selected from the following: a light suitable to illuminate at least a portion of the worksite; and a ventilation device suitable to improve ventilation of the worksite.

It will be understood that Method 100 can be practiced with limitations in addition to the limitations set forth in the preceding paragraphs. According to an embodiment, Method 100 is practiced wherein each of the worksite monitoring equipment packages includes at least one worksite prepositioned rescue apparatus.

It will be understood that Method 100 can be practiced with limitations in addition to the limitations set forth in the preceding paragraphs. According to an embodiment, Method 100 is practiced wherein each of the worksite monitoring equipment packages complies with at least one product safety standard applied to enable safe operation in an environment containing potentially flammable materials.

It will be understood that Method 100 can be practiced with limitations in addition to the limitations set forth in the preceding paragraphs. According to an embodiment, Method 100 is practiced wherein each of the worksite monitoring equipment packages complies with at least one product safety standard at least as restrictive as a Class I, Division II device classification in order to enable safe operation in an environment containing potentially flammable materials in a gas phase.

It will be understood that Method 100 can be practiced with limitations in addition to the limitations set forth in the preceding paragraphs. According to an embodiment, Method 100 is practiced wherein at least one communications link includes a suitable cable bundle extending from the central monitoring station equipment to at least one of the worksite monitoring equipment packages.

It will be understood that Method 100 can be practiced with limitations in addition to the limitations set forth in the preceding paragraphs. According to an embodiment, Method 100 is practiced wherein at least one communications link includes a wireless receiver connected to the central monitoring station equipment to receive wireless transmissions from at least one wireless transmitter connected to a respective one of the worksite monitoring equipment packages.

It will be understood that Method 100 can be practiced with limitations in addition to the limitations set forth in the preceding paragraphs. According to an embodiment, Method 100 is practiced wherein a communications link further includes at least one intermediate signal relay, the at least one intermediate signal relay being located at a relay location, the relay location being located intermediate a wireless receiver connected to the central monitoring station equipment and at least one wireless transmitter connected to a respective one of the worksite monitoring equipment packages to relay wireless transmissions from the at least one wireless transmitter to the wireless receiver.

It will be understood that Method 100 can be practiced with limitations in addition to the limitations set forth in the preceding paragraphs. According to an embodiment, Method 100 is practiced wherein the at least one intermediate signal relay includes an antenna mounted on a base, the base having a magnet suitable to be temporarily affixed to a metallic structure to support the antenna at the relay location.

It will be understood that Method 100 can be practiced with limitations in addition to the limitations set forth in the preceding paragraphs. According to an embodiment, Method 100 is practiced wherein each of the worksite monitoring equipment packages includes only apparatus at least meeting the specifications of a Class I Division II device suitable for operation in an environment including potentially flammable vapors.

Methods and apparatus for monitoring a plurality of worksites are described. Although specific embodiments are illustrated and described herein, it will be appreciated by those of ordinary skill in the art that any arrangement which is calculated to achieve the same purpose can be substituted for the specific embodiments shown. This application is intended to cover any adaptations or variations. Those of ordinary skill in the art will appreciate that other terminology can be used to describe subject matter in this application. It is expected that terminology used herein will not be considered as limiting the scope of embodiments. It will be understood that implementations falling within the scope of embodiments can be made using any suitable materials and constructions, and can be described using suitable terminology other than the specific terminology set forth in this application. In particular, one of skill in the art will readily appreciate that the names of the methods and apparatus are not intended to limit embodiments. Furthermore, additional methods and apparatus can be added to the components, and functions can be rearranged among the components. New components corresponding to future enhancements and physical devices used in embodiments can be introduced without departing from the scope of embodiments. One of skill in the art will readily recognize that embodiments are applicable to future technologies, such as materials, circuitry, logic, and other components. The terminology used in this application with respect to embodiments is meant to include all structures, constructions, elements, environments, and alternate technologies which provide the same functionality as described herein.

What is claimed is:

1. A method for monitoring a plurality of worksites where labor is performed by workmen, the plurality of worksites being co-located at a facility, said method comprising:

transporting to the facility aboard a suitable movable transport a transportable monitoring system package, the transportable monitoring system package including a plurality of worksite monitoring equipment packages to be deployed at the worksites, the transportable monitoring system package including one central monitoring station package, the central monitoring station package including a transport container, the transport container having a set of container sides, the transport container having a waterproof interior defined intermediate the set of container sides, the central monitoring station package including central monitoring station equipment housed in the transport container, the central monitoring station equipment including moisture-sensitive electronic components housed in the waterproof interior, the waterproof interior defining a central monitoring station workspace, the central monitoring station workspace having interior dimensions which are at least sufficient to accommodate therein a monitoring technician to operate the central monitoring station equipment;

seating the transport container in a stationary position at a central monitoring location at the facility, the central monitoring location being remote from the worksites, the transport container having an entry portal suitable to permit ingress by the monitoring technician into the central monitoring station workspace from an external environment, the external environment being outside the transport container at the central monitoring location;

stationing at each worksite at least one of the worksite monitoring equipment packages, each of the worksite monitoring equipment packages including at least one remote monitoring sensor, the at least one remote monitoring sensor being operable to collect remote monitoring information at the respective worksite;

connecting communication links between each remote monitoring sensor and the central monitoring station equipment, each communication link being suitable to transmit remote transmissions from a respective remote monitoring sensor to the central monitoring station equipment, the remote transmissions conveying the remote monitoring information;

transmitting the remote transmissions over the communication links from the respective remote monitoring sensors to the central monitoring station equipment in a manner suitable to provide the remote monitoring information on a near real-time basis to the central monitoring station equipment;

displaying by operation of the central monitoring station equipment the remote monitoring information received in the remote transmissions to inform the monitoring technician of same; and responding when the monitoring technician identifies that the remote monitoring information meets a response threshold criteria by notifying responsible personnel to take corrective action relating to a worksite, the worksite corresponding to certain of the remote monitoring information meeting the response threshold criteria.

2. The method according to claim 1 and further comprising:
wherein each of the worksite monitoring equipment packages includes at least one remote monitoring sensor selected from the following:
a camera suitable to provide thermal image data of a worksite;
a camera suitable to provide visual image data of a worksite;
a gas detection instrument suitable to provide gas detection data of a worksite;
an environmental microphone suitable to provide audio data of a worksite;
a manual alarm button suitable to provide manual alarm data of a worksite; and
a voice communications microphone associated with a worker located at a worksite and suitable to transmit voice communications from the worker.

3. The method according to claim 1 and further comprising:
wherein each of the worksite monitoring equipment packages includes at least one worksite conditioning apparatus.

4. The method according to claim 3 and further comprising:
wherein each of the worksite monitoring equipment packages includes at least one worksite conditioning apparatus selected from the following:
a light suitable to illuminate at least a portion of the worksite; and
a ventilation device suitable to improve ventilation of the worksite.

5. The method according to claim 1 and further comprising:
wherein each of the worksite monitoring equipment packages complies with at least one product safety standard applied to enable safe operation in an environment containing potentially flammable materials.

6. The method according to claim 1 and further comprising:
wherein each of the worksite monitoring equipment packages complies with at least one product safety standard at least as restrictive as a Class I, Division II device classification in order to enable safe operation in an environment containing potentially flammable materials in a gas phase.

7. The method according to claim 1 and further comprising:
wherein at least one communications link includes a suitable cable bundle extending from the central monitoring station equipment to at least one of the worksite monitoring equipment packages.

8. The method according to claim 1 and further comprising:
wherein at least one communications link includes a wireless receiver connected to the central monitoring station equipment to receive wireless transmissions from at least one wireless transmitter connected to a respective one of the worksite monitoring equipment packages.

9. The method according to claim 8 and further comprising:
wherein a communications link further includes at least one intermediate signal relay, the at least one intermediate signal relay being located at a relay location, the relay location being located intermediate a wireless receiver connected to the central monitoring station equipment and at least one wireless transmitter connected to a respective one of the worksite monitoring equipment packages to relay wireless transmissions from the at least one wireless transmitter to the wireless receiver.

10. The method according to claim 9 and further comprising:
wherein the at least one intermediate signal relay includes an antenna mounted on a base, the base having a magnet suitable to be temporarily affixed to a metallic structure to support the antenna at the relay location.

11. The method according to claim 1 and further comprising:
wherein each of the worksite monitoring equipment packages includes only apparatus at least meeting the specifications of a Class I Division II device suitable for operation in an environment including potentially flammable vapors.

12. The method according to claim 1 and further comprising:
wherein each of the worksite monitoring equipment packages includes prepositioned rescue equipment.

13. Apparatus for monitoring a plurality of worksites located at an offshore facility, each worksite including a confined space, each confined space presenting a danger to workmen laboring therein at least because of an access limitation relating thereto, said apparatus comprising:
- a central monitoring station package including central monitoring station equipment housed in a transport container, the transport container being configured to be transported to the offshore facility via a suitable movable transport, the transport container having a set of container sides, the transport container having a waterproof interior defined intermediate the set of container sides, the transport container including a central monitoring station workspace defined in the waterproof interior, the central monitoring station workspace having interior dimensions which are at least sufficient to accommodate therein a monitoring technician to operate the central monitoring station equipment, the central monitoring station equipment including moisture-sensitive electronic components housed in the waterproof interior, the transport container having a lifting frame configured to support the lifting container when engaged by a suitable hoist to transfer the transport container from a movable transport to a stationary position at a central monitoring location at the offshore facility, the transport container having an entry portal suitable to permit ingress by a monitoring technician into the central monitoring station workspace from an external environment, the external environment being outside the transport container at the central monitoring location;
- a plurality of worksite monitoring equipment packages to be stationed at the worksites, each of the worksite monitoring equipment packages including at least one remote monitoring sensor, the at least one remote monitoring sensor being operable to collect remote monitoring information at the respective worksite, the at least one remote monitoring sensor including at least the following:
  - a camera suitable to provide thermal image data of a worksite,
  - a camera suitable to provide visual image data of a worksite, and
  - a gas detection instrument suitable to provide gas detection data of a worksite;
- a plurality of communication links suitable to connect each remote monitoring sensor and the central monitoring station equipment, each communication link being suitable to transmit remote transmissions from a respective remote monitoring sensor to the central monitoring station equipment, the remote transmissions conveying the remote monitoring information, at least one communication link including a wireless receiver connected to the central monitoring station equipment to receive wireless transmissions on a near real-time basis from at least one wireless transmitter connected to a respective one of the worksite monitoring equipment packages;
- wherein the central monitoring station equipment is operable to display the remote monitoring information received in the remote transmissions to inform the monitoring technician of same; and
- wherein the central monitoring station equipment is operable to enable the monitoring technician to identify conditions when the remote monitoring information received from a worksite meets a response threshold criteria, the central monitoring station equipment being operable to enable the monitoring technician to notify responsible personnel to take corrective action relating to a worksite, the worksite corresponding to certain of the remote monitoring information meeting the response threshold criteria.

14. The apparatus according to claim 13 and further comprising:
- wherein each of the work site monitoring equipment packages includes at least one additional remote monitoring sensor selected from the following:
  - a camera suitable to provide thermal image data of a worksite;
  - a camera suitable to provide visual image data of a worksite;
  - a gas detection instrument suitable to provide gas detection data of a worksite;
  - an environmental microphone suitable to provide audio data of a worksite;
  - a manual alarm button suitable to provide manual alarm data of a worksite; and
  - a voice communications microphone associated with a worker located at a worksite and suitable to transmit voice communications from the worker.

15. The apparatus according to claim 13 and further comprising:
- wherein each of the worksite monitoring equipment packages includes at least one worksite conditioning apparatus.

16. The apparatus according to claim 15 and further comprising:
- wherein each of the worksite monitoring equipment packages includes at least one worksite conditioning apparatus at least meeting the specifications of a Class I Division II device suitable for operation in an environment including potentially flammable vapors and selected from the following:
  - a light suitable to illuminate at least a portion of the worksite; and
  - a ventilation device suitable to improve ventilation of the worksite.

17. The apparatus according to claim 13 and further comprising:
- wherein each of the worksite monitoring equipment packages complies with at least one product safety standard applied to enable safe operation in an environment containing potentially flammable materials.

18. The apparatus according to claim 17 and further comprising:
- wherein each of the worksite monitoring equipment packages complies with at least one product safety standard at least as restrictive as a Class I, Division II device classification in order to enable safe operation in an environment containing potentially flammable materials in a gas phase.

19. The apparatus according to claim 13 and further comprising:
- wherein at least one communications link includes a suitable cable bundle extending from the central monitoring station equipment to at least one of the worksite monitoring equipment packages.

20. The apparatus according to claim 19 and further comprising:
- wherein at least one communications link includes a wireless receiver connected to the central monitoring station equipment to receive wireless transmissions from at least one wireless transmitter connected to a respective one of the worksite monitoring equipment packages.

21. The apparatus according to claim 20 and further comprising:
- wherein a communications link further includes at least one intermediate signal relay, the at least one intermediate signal relay being located at a relay location, the relay location being located intermediate a wireless receiver connected to the central monitoring station equipment and at least one wireless transmitter connected to a respective one of the worksite monitoring equipment packages to relay wireless transmissions from the at least one wireless transmitter to the wireless receiver.

22. The apparatus according to claim 21 and further comprising:

wherein each of the worksite monitoring equipment packages includes only apparatus at least meeting the specifications of a Class I Division II device suitable for operation in an environment including potentially flammable vapors.

23. The apparatus according to claim 13 and further comprising:

wherein each of the worksite monitoring equipment packages includes prepositioned rescue equipment.

\* \* \* \* \*